A. M. McGILL.
COMBINED LATHE AND DRILL.
APPLICATION FILED JUNE 21, 1915.
1,167,091.
Patented Jan. 4, 1916.
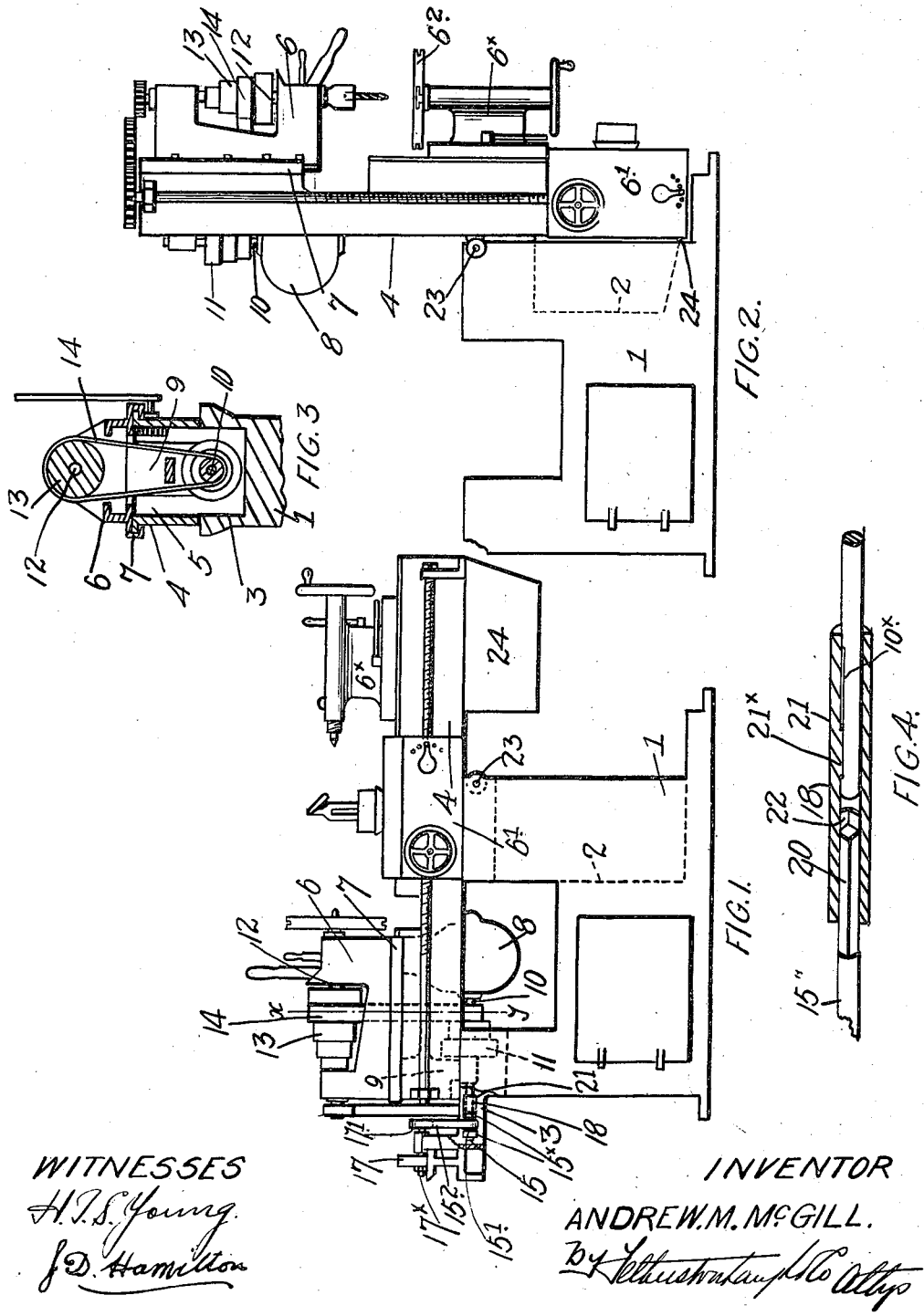
WITNESSES
H. T. S. Young.
J. D. Hamilton
INVENTOR
ANDREW. M. McGILL.

UNITED STATES PATENT OFFICE.

ANDREW MELVILLE McGILL, OF TORONTO, ONTARIO, CANADA.

COMBINED LATHE AND DRILL.

1,167,091. Specification of Letters Patent. Patented Jan. 4, 1916.

Application filed June 21, 1915. Serial No. 35,254.

*To all whom it may concern:*

Be it known that I, ANDREW MELVILLE McGILL, of the city of Toronto, in the county of York, in the Province of Ontario, Canada, have invented certain new and useful Improvements in Combined Lathes and Drills, of which the following is the specification.

My invention relates to improvements in combined lathes and drills and the object of the invention is to devise a machine of this class which may be readily convertible to be used either as a lathe or as a drill whenever required and it consists essentially of a base member, a lathe body swung intermediately of its length on the base member, a lathe head slidably mounted on one end of the lathe body, a motor carried thereby, a drill shaft mounted within the lathe head and a driving connection between the motor shaft and the drill shaft as hereinafter more particularly explained by the following specification.

Figure 1, represent a side elevation of my machine arranged for use as a lathe. Fig. 2, is a similar view to Fig. 1 showing my machine arranged for use as a drill. Fig. 3, is a cross section on line $x-y$ Fig. 1. Fig. 4, is a detail of the clutch connection employed in my device.

In the drawings like letters of reference indicate corresponding parts in each figure.

1 indicates the base of my machine provided with a recessed portion 2 and an open or recessed portion 3.

4 indicates the lathe body provided with an open central portion 5 (see Fig. 3).

6 indicates the lathe head mounted upon the lathe body at 7 in the usual manner which is common practice in machines of this class.

8 indicates the motor, the casing of which is secured to or formed integral with the drill body 6.

9 indicates a bearing member extending downwardly from the lathe head 6.

10 indicates a motor shaft journaled at one end in the motor casing 8 and intermediately of its length in the bearing 9.

11 indicates a change speed pulley mounted upon the motor shaft 10.

12 indicates the drill shaft journaled in the lathe head 6.

13 indicates a change speed pulley mounted on the shaft 12.

14 indicates a belt extending between the pulley 13 and pulley 11.

By this construction it will be seen that the motor, motor shaft and pulley 11 are all carried by the lathe head 6 and are movable therewith.

15 indicates a supplemental shaft journaled in bearings $15^x$ carried by the base 1.

17 indicates a grind stone mounted on the shaft $17^x$ journaled in suitable bearings.

$17'$ indicates a pulley mounted upon the shaft $17^x$ and $15'$ indicates a pulley mounted on the shaft 15.

$15^2$ indicates a belt connecting the pulley $15'$ with the pulley $17'$.

18 indicates a clutch connection between the supplemental shaft 15 and the motor shaft 10.

Any suitable clutch connection might be employed and I do not lay claim to the construction of this connection and the construction shown in Fig. 4 is only one way by which this connection may be made.

In Fig. 4 I have shown the shaft 15 with a squared end 20.

21 indicates a sleeve slidably mounted upon the motor shaft 10 and provided at one end with a squared socket 22 fitting the squared end 20 of the shaft 15.

$21^x$ indicates a feather key carried by the sleeve 21 and $10^x$ indicates a slot in which the key $21^x$ slidably fits.

23 indicates a horizontal pivot connection carried by the body 1 and by which the lathe body 4 is connected to the base 1.

24 indicates a counterweight carried by the lathe body at the opposite end to the lathe head 6.

When it is desired to use my lathe as a drill all that it is necessary to do is to swing the end of the lathe body carrying the counterweight 24 downwardly so that the counterweight enters the recess 2 and the lathe body assumes the vertical position shown in Fig. 2 of the drawings. When the lathe body is swung up into this position the drill head 6, motor and motor shaft and driving pulley 11 are all carried upwardly together.

It will, of course, be understood that the motor shaft is first disconnected from the supplemental shaft 15 by sliding the sleeve 21 longitudinally inwardly toward the pulley 11 so that the motor shaft is disengaged from the supplemental shaft. When in the vertical position the tail stock 6<sup>x</sup> is removed from the machine and placed in the position shown in this figure, the tool carriage 6' of the lathe being moved downwardly toward the lower end of the lathe body into the position shown in Fig. 2. The construction of this tail stock and the means by which it is connected to the lathe is that ordinarily employed in this class of machine and it is, therefore, thought to be unnecessary to describe the same in detail. A table 6² is then secured to the tail stock and the machine is then adapted for use as a drill.

From this description it will be seen that I have devised a machine which will very easily and quickly be convertible from a lathe into a vertical drill and which will, therefore, minimize the expense incurred in installing a plant where this class of machinery is necessary. Also in the construction shown I have shown a grind stone which may be driven from the motor of the lathe, such grind stone and driving mechanism forming an integral part of the machine. Therefore, when installing a plant instead of having to buy three machines, that is to say, a lathe, a drill and a grind stone I am enabled by the construction of my machine to provide a device in which all three machines are embodied in one.

What I claim as my invention is.

1. In a combined lathe and drill, the combination with the base provided with a recess in one side thereof, a lathe body supported normally upon the top of the base and having one end extended beyond the base edge, of means for swingably supporting the lathe body at the edge of the base above the aforesaid recess, a counterweight carried by the outwardly extending end of the lathe body designed to enter the recess when the lathe body assumes a vertical position, and means carried by the lathe body for driving the lathe.

2. In a combined lathe and drill, the combination with the base, of a lathe body swingably supported upon the base so as to assume either a horizontal position resting upon the top of the base or a vertical position parallel with one side of the base, a lathe head carried by the lathe body provided with a suitable drill shaft, a motor carried by the lathe head, bearings depending from the lathe head, a motor shaft journaled in such bearings, and a driving connection between the motor shaft and the drill shaft.

ANDREW MELVILLE McGILL.

Witnesses:
 E. PENNOCK,
 M. EGAN.